(12) United States Patent
Miao et al.

(10) Patent No.: US 10,154,486 B2
(45) Date of Patent: Dec. 11, 2018

(54) DOWNLINK SIGNALING FOR UE SPECIFIC CYCLIC PREFIX TRANSMISSION

(71) Applicant: INTEL CORPORATION, Santa Clara, CA (US)

(72) Inventors: Honglei Miao, Munich (DE); Cecilia Carbonelli, Munich (DE); Michael Faerber, Wolfratshausen (DE); Ingolf Karls, Feldkirchen (DE); Bernhard Raaf, Neuried (DE); Hyung-Nam Choi, Hamburg (DE); Maria Fresia, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 253 days.

(21) Appl. No.: 14/928,820

(22) Filed: Oct. 30, 2015

(65) Prior Publication Data

US 2017/0127411 A1 May 4, 2017

(51) Int. Cl.
*H04W 72/04* (2009.01)
*H04L 27/26* (2006.01)
*H04W 76/27* (2018.01)
*H04W 72/08* (2009.01)
*H04L 5/00* (2006.01)

(52) U.S. Cl.
CPC ....... *H04W 72/0446* (2013.01); *H04L 5/0005* (2013.01); *H04L 27/2607* (2013.01); *H04L 27/2646* (2013.01); *H04W 72/042* (2013.01); *H04W 72/085* (2013.01); *H04W 76/27* (2018.02); *H04L 5/0007* (2013.01); *H04L 5/0053* (2013.01)

(58) Field of Classification Search
None
See application file for complete search history.

(56) References Cited

U.S. PATENT DOCUMENTS

2013/0022090 A1  1/2013  Weng et al.
2016/0233986 A1*  8/2016  Lee ................... H04W 72/1289

OTHER PUBLICATIONS

G.Berardinelli, F.Tavares, T.Sorensen, P.Mogensen and K.Pajukoski "Zero tail DFT-spread-OFDM signals," Globecom 2013 workshop—Broadband Wireless Access.
S.S.Das, M.I.Rahman, F.H.P.Fitzek,R.Pradad, Variable Guard interval for OFDM based WLANs, IEEEInternationalSymposiumonPersonal,IndoorandMobileRadioCommunications, 2005.

(Continued)

*Primary Examiner* — Willie J Daniel, Jr.
(74) *Attorney, Agent, or Firm* — Thorpe North & Western

(57) ABSTRACT

Technology for downlink signaling between an enhanced Node B (eNB) and user equipment (UE) with a selected cyclic prefix (CP) for the UE is disclosed. In an example, a user equipment (UE) can include circuitry configured to: estimate a delay spread for a corresponding channel between the eNB and the UE; communicate the estimated delay spread from the UE to the eNB to enable the eNB to determine a selected cyclic prefix (CP) length for downlink signaling; receive the selected CP length from the eNB for a transmission time interval (TTI); and process received downlink data for the TTI using the selected CP length.

20 Claims, 9 Drawing Sheets

(56) References Cited

OTHER PUBLICATIONS

S.D'Alessandro,A.M.Tonello,L.Lampe "Improving WLAN Capacity via OFDMA and Cyclic Prefix Adaptation" Wireless Days (WD),2009 $2^{nd}$ IFIP.

Z.Zhang,L.Lai "A novel OFDM transmission scheme with length-adaptive Cyclic Prefix" JZUS2003. https://pdfs.semanticscholar.org/449c/5b5569e17b9bc8866617ff50c071e45df343.pdf.

M.Batariere,K.Baum,T.P.Krauss "Cyclic Prefix Length Analysis for 4G OFDM Systems" VehicularTechnologyConference,2004. VTC2004—Fall.2004 IEEE $60_{th}$ (vol. 1).

A.Khlifi,R.Bouallegue "An Enhanced Channel Estimation Technique with Adaptive Cyclic PrefixLengthforLTEDownlinkSystems "201310thInternationalMulti-ConferenceonSystems, Signals & Devices(SSD) Hammamet,Tunisia,Mar. 18-21, 2013.

3GPPTS36.211V9.1.0 (Mar. 2010) $3^{rd}$ Generation Partnership Project; Technical Specification Group Radio Access Network; Evolved Universal Terrestrial Radio Access (E-UTRA); Physical Channels and Modulation (Release 9). http://www.qtc.jp/3GPP/Specs/36211-910.pdf.

\* cited by examiner

DOWNLINK SIGNALING FOR UE SPECIFIC CYCLIC PREFIX TRANSMISSION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). Cyclic prefix (CP) orthogonal frequency-division multiplexing (OFDM) technique can be used in a wireless system, such as in long term evolution (LTE) and wireless locale area network (WLAN) standards. However, CP is generally viewed as overhead, as such, a need exists to optimize the CP length to provide increased efficiency in perform downlink signaling in wireless communication systems.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
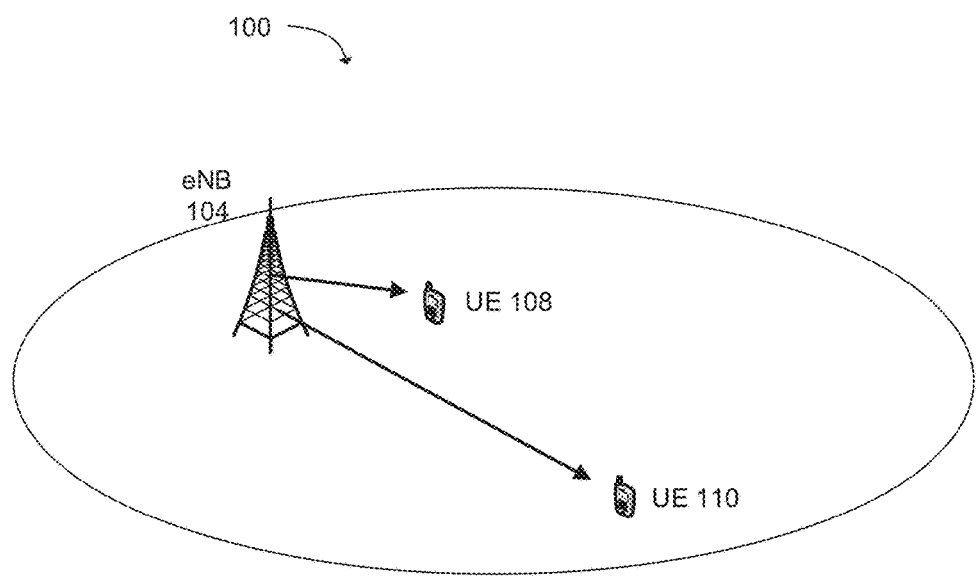
FIG. 1 illustrates an LTE operation zone within a cell having an evolved node B (eNB) with two devices in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Cyclic prefix (CP) orthogonal frequency-division multiplexing (OFDM) techniques can be used in a wireless system, such as in third generation partnership project (3GPP) long term evolution (LTE) and wireless locale area network (WLAN) standards. The CP can be employed to reduce the inter-symbol-interference and convert the channel effects of linear convolution caused by the multipath transmission to the cyclic convolution so that the fast Fourier transform (FFT) at the receiver (e.g., a mobile device) side accomplishes the complex equalization functionality. However, the CP transmission inevitably introduces system overhead. The CP length can be a system parameter that is assumed to be able to handle a delay spread (DS) experiencing by the user equipment (UEs) in a cell, otherwise, the strong inter-symbol interference would cause a radio link failure and trigger a handover procedure for the UE.

However when the delay spread (DS) of the UE is much smaller than the system CP, it is plausible to use a smaller CP length than the system defined CP in order to save overhead while increasing system throughput or save power.

One approach can be to enable a UE/link specific CP transmission and reduce the CP overhead by taking into account, for example, the actual UE DS. For instance, a zero-tail discrete Fourier transform (DFT)-s-orthogonal frequency division multiplexing (OFDM) technique can be used for both downlink and uplink. This process utilizes a deliberately designed zero tail (ZT) to replace the CP and realize a variable guard interval according to the actual DS perceived by the UE. By doing this, the receiver is able to cope with the inter-symbol interference (ISI) and at the same time employ FFT techniques. Similarly, in the context of WLAN, a variable guard interval (GI) OFDM can be used together with an algorithm to dynamically estimate the GI for the data portion of the transmission (a fixed GI is still used for training sequence and header symbols). However, there is a significant tradeoff between inter-carrier interference (ICI)/ISI power and capacity versus CP length for LTE. Also, in 3GPP systems, channel state information (CSI) fed back by the UE in the uplink does not contain any indication on the delay spread experienced by the UE and thus on the recommended CP length. Moreover, even if such a mechanism was available, due to different possible UE reporting schemes and system level optimization requirements, the actual adopted CP length applied during a particular transmit time internal (TTI) may not be necessarily the same as the one estimated, proposed, and/or reported by the UE. Moreover, many common channels, such as system information and synchronization signals targeting for all the UEs in the cell, which potentially have various delay spreads, will adopt the same CP length which corresponds to the worst possible DS to be experienced by an UE in the cell. The set of fixed CP lengths supported for common channels is specified in the standard, and the UE blindly detects which one of the fixed CP lengths is being used for the common channels in the current cell. Similarly, within an LTE system, the UE blindly detects whether a normal or an extended CP is used. The size of the search space for the CP length could be larger than 2 to make sure scenarios with diverse delay spread and cell sizes can be covered in a more optimized manner. It should be noted that a UE can have an entity to blindly detect a CP length. For example, in 3GPP LTE, the number of supported different CP length is 2 (such as 2 microseconds "us") and the UE can take these two hypothesis and applies a certain cell search algorithm to identify which CP length is employed in a current cell.

Therefore, to address these challenges, the technology described herein, provides for downlink signaling for a UE specific CP transmission. In other words, the technology is described for downlink signaling between an enhanced Node B (eNB) and user equipment (UE) with a selected cyclic prefix (CP) for the UE. In one aspect, a UE can estimate a delay spread for a corresponding channel between the eNB and the UE. The UE can communicate the estimated delay spread from the UE to the eNB to enable the eNB to determine a selected cyclic prefix (CP) length for downlink signaling. The UE can receive the selected CP length from the eNB for a transmission time interval (TTI) (e.g., the UE can be informed about the actual optimal (or selected) CP length of the OFDM symbol adopted in a particular TTI.) The UE can process received downlink data for the TTI using the selected CP length.

In one aspect, the eNB can receive an estimated delay spread for a corresponding channel from the UE. The eNB can determine a selected cyclic prefix (CP) length for downlink signaling based on the estimated delay spread. The eNB can communicate the selected CP length to the UE for a transmission time interval (TTI).

In one aspect, the technology is described for efficient cell specific and UE specific signaling methods for the eNB to signal an optimal CP length in a particular TTI to the UE to implement length adaptive CP in a fast or slow manner. These signaling method include a new physical-CP-indicator-channel (PCPICH) signaling, system information broadcast signaling, a UE specific RRC signaling, and UE dynamic signaling.

For example, one possible scenario where to employ an adaptive CP transmission for downlink signaling between an enhanced Node B (eNB) and user equipment (UE) with a selected cyclic prefix (CP) for the UE can be observed in FIG. 1. For example, one possible scenario where to employ an adaptive CP transmission for downlink signaling between an enhanced Node B (eNB) and user equipment (UE) with a selected cyclic prefix (CP) for the UE can be observed in FIG. 1. FIG. 1 illustrates an LTE operation zone within a cell 100 having an evolved node B (eNB) with two devices. FIG. 1 illustrates an eNB 104 that can be associated with an anchor cell, macro cell or primary cell. Also, the cell 100 can include User equipment (UE or UEs) 108, 110 that are in communication with the eNB 104.

The eNB 104 can be a high transmission power eNB, such as a macro eNB, for coverage and connectivity. The eNB 104 can be responsible for mobility and can also be responsible for radio resource control (RRC) signaling. User equipment (UE or UEs) 108, 110 can be supported by the macro eNB 104.

As shown in FIG. 1, the UE1 108 can be located relatively close to the eNB 104 whereas the UE2 110 is positioned close to the cell edge. When the eNB 104 has knowledge about preferred CP lengths for both UEs 108, 110, it can be possible that the eNB 104 decides to employ a shorter CP for the data packet targeted for the UE1 108, and a longer CP for the data packet of the UE2 110.

In one aspect, the eNB can decide the actual (e.g., optimal or selected) CP length to be transmitted in a particular TTI, or group of TTIs, for the UE data packet, and the selected CP length can be the CP length that is fed back from the UE. For example, fast feedback downlink control information (DCI) can be used to allow a change in each TTI. Alternatively, slow feedback DCI can be used thereby requiring the UE to transmit with the same CP length for multiple TTIs. In one aspect, the same CP length can be used until the UE receives a message via RRC signaling. The CP length for the common channels in the cell can be defined and/or represented as "Tcp" and it can assumed that the UE specific CP length can be selected, for example, out of a finite set of {Tcp, Tcp/2, Tcp/4, Tcp/8, 0}. It should be noted that the CP length can affect the number of OFDM symbols in one TTI, and possibly the pilot signal placement pattern in the resource grid of the TTI. All of these settings can be either hardcoded in a specification or adaptively signaled between the eNB and UEs.

Depending on how the eNB and UE communicate information regarding adaptive CP length, the following UE/link specific CP transmission methods are proposed for the UE to determine a CP length of the UE data channel in a certain TTI and proceed with subsequent receiver processing. As will be described below, the following four operations/methods are described for determining the CP length of the UE data channel in a certain TTI. The four operations/methods include 1) a new physical-CP-indicator channel (PCPICH) signaling that is cell specific and fast adapting, 2) a system information broadcasting signal that is cell specific and slow adapting, 3) a UE specific RRC signaling that is UE specific and slow adapting, and 4) a UE dynamic signaling that is UE specific and fast adapting.

Figure 2:
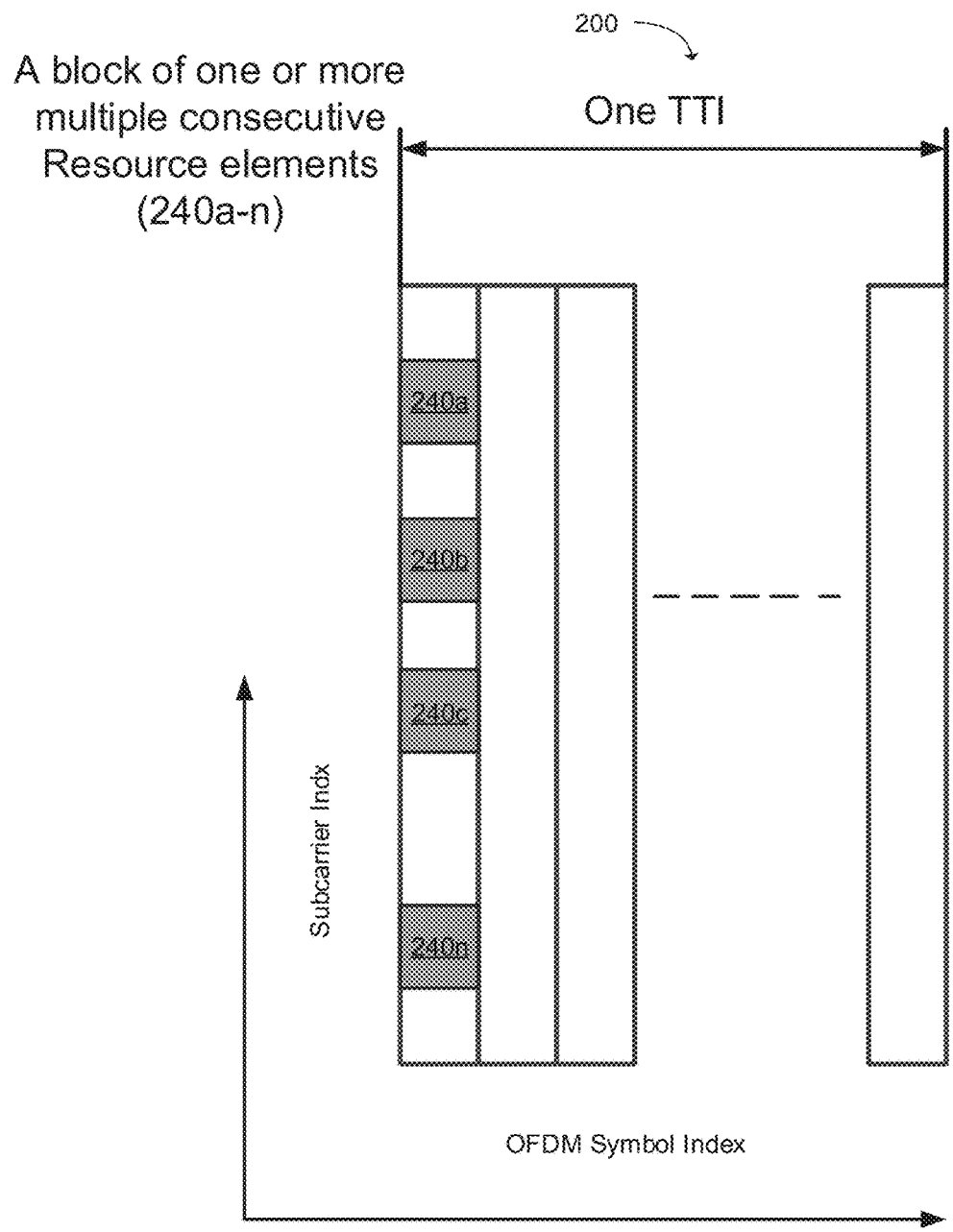
FIG. 2 illustrates a cell specific cyclic prefix (CP) communicated in an allocated physical-CP-indicator channel in a resource element grid of a single transmission time interval (TTI) in accordance with an example.

As illustrated in FIG. 2, a UE/link specific CP transmission (e.g., method 1) is provided using a new physical channel with a cell specific CP transmitted in every TTI to signal the CP length being used for the data channel in the current TTI. That is, FIG. 2 illustrates a communicating a cell specific cyclic prefix (CP) in an allocated physical-CP-indicator channel in a resource element grid 200 of a single transmission time interval (TTI). For instance, several sequences are defined for the physical-CP-indicator channel and each sequence stands for a specific CP length. In one aspect, the physical-CP-indicator channel can be placed in the first OFDM symbol of the current TTI. The frequency resources allocated for the physical-CP-indicator channel can be distributed over a large bandwidth within the system bandwidth (e.g., distributed over the whole system bandwidth) to achieve efficient frequency diversity for a reliable reception of the physical-CP-indicator channel at the UE. Depending on the coverage of the physical-CP-indicator channel, the required coding and/or processing gain and the number of information bits to be conveyed determine the number of resource elements (REs) 240 (illustrated collectively in FIG. 2 as 240a-n) to be used for the physical-CP-indicator channel. As shown in the FIG. 2, the resource elements 240 can represent, for example, the physical-CP-indicator channel allocation 200 in one TTI.

The physical-CP-indicator channel is configured to signal the CP length to be used in the current TTI. The physical-CP-indicator channel signals can be transmitted in the first OFDM symbol at fixed frequency locations, and use the cell specific CP so that all the UEs in the cell can demodulate the physical-CP-indicator channel. After correct demodulation of the physical-CP-indicator channel, the UE possesses the knowledge about the CP length employed in the current TTI.

Figure 3:
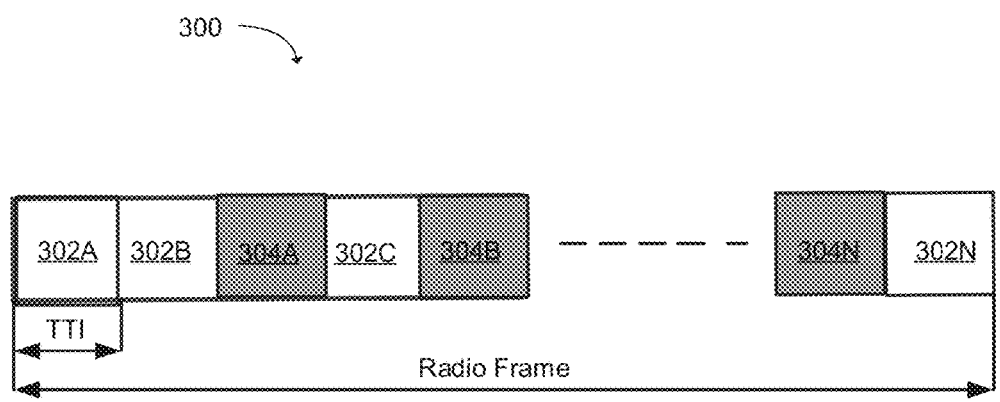
FIG. 3 illustrates a cell specific cyclic prefix (CP) broadcasted in one or more transmission time intervals (TTI) in a radio frame in accordance with an example.

Turning now to FIG. 3, a UE/link specific CP transmission (method 2) 300 is provided by broadcasting a cell specific cyclic prefix (CP) in one or more transmission time intervals (TTI) in a radio frame. In one aspect, the eNB can broadcast a new system information message to convey the CP length to be used in each TTI of a radio frame. It should be noted that TTIs having no CPs are indicated as TTIs 302A-N (collectively illustrated as 302) and those TTIs having a CP are indicated as 304A-N (collectively illustrated as 304). That is, the new system information message defines the CP length for each TTI in the radio frame. For example, one radio frame can be comprised of "x" consecutive TTIs, and the new system information message can be realized by a vector of "x" elements of enumeration type, which defines the possible CP lengths to be supported in a wireless system. For example, assume a system can support at least 3 types of CP lengths, namely, small, medium and large, which can be represented by 1, 2 and 3. Assuming one radio frame includes 10 TTIs, the proposed technology can transmit a new system information message including a vector of 10 elements, and the value of each element can be 1, 2 or 3 which corresponds to small, medium or large CP length, respectively. This would imply that those TTIs with smaller CP length would mainly be scheduled for those UEs experiencing smaller DS. For example, returning to the scenario illustrated in FIG. 1 and applying FIG. 3 to FIG. 1. The TTI sequence in one radio frame is shown in FIG. 3. TTIs 302 use no CP and can be used for UE1, while TTIs 304 employ cell specific CPs, which can be used for all the UEs in the cell. That is, in those TTIs for the UE1 108 data, no CP is used while the cell specific CP is employed during those TTIs for the UE2 110 data.

In one aspect, the eNB 104 can utilize the adaptive CP transmission by scheduling UE1 108 and UE2 110 in different TTIs 302,304. In those TTIs 302 for the UE1 108 data, no CP is used, while the cell specific CP is employed during those TTIs 304 for the UE2 110 data. A certain TTI partition algorithm can be employed by the eNB to take into account the UE traffic demands and QoS requirement. It should be noted that the TTI transmitting system information is assumed to utilize the cell specific CP so that all the UEs in the cell can correctly decode the system information. With the correct reception of this new system information message, the UE has the knowledge of the selected CP length in each TTI of the coming radio frame.

Figure 4:
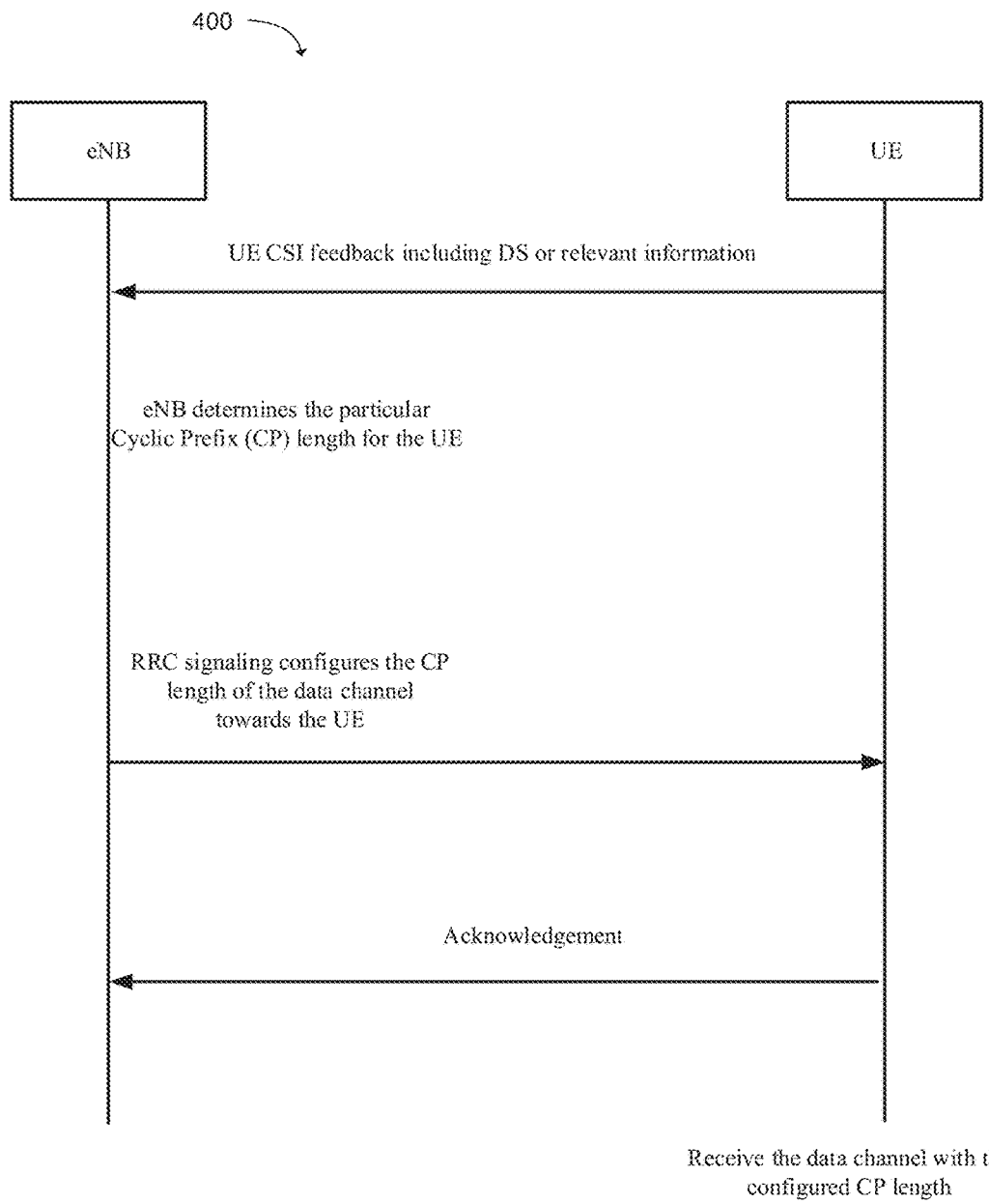
FIG. 4 illustrates a cyclic prefix (CP) length configured for a data channel for a device for being communicated in a radio resource control (RRC) signal in accordance with an example.

Turning now to FIG. 4, a UE/link specific CP transmission (method 3) 400 is provided by communicating in a radio resource control (RRC) signal having a cyclic prefix (CP) length for a data channel for a device. As shown in FIG. 4, a UE can provide the eNB with channel state information (CSI) including a DS and/or other relevant or desired information, such as a preferred CP length based on an estimated DS. Upon the eNB receiving the UE feedback about the preferred CP length, the eNB can apply a certain algorithm to determine the CP length and employ a dedicated RRC signaling to inform the UE that all the data packets of this UE transmitted afterwards shall employ a certain CP length. That is, the RRC signaling configures the CP length of the data channel for the UE. When the DS of the UE changes considerably, the eNB can reconfigure the CP length to be used for the UE data packet transmission as per the updated UE CP feedback information.

Based on the cell load and UE scheduling algorithm, the eNB can divide UEs into different groups, and all the UEs in one group can be scheduled in the same TTI. In such case, the CP length to be used for a particular UE can be the maximum of the CP feedback from different UEs in the same group. An acknowledgement can also be sent from the UE back to the eNB.

Thus, based upon the UE feedback and system optimization, the eNB can determine the CP length for the data channels towards the UE, and send new UE specific RRC signaling to inform the UE of the CP length. It should be noted that if the DS of the UE changes significantly, the UE can feedback this updated CSI to the eNB and the eNB can reconfigure the CP length for the UE by method 2 described in FIG. 3 accordingly.

The fourth method (method 4), assumes that the control channel that is scheduling the data packet employs a fixed CP transmission, i.e., cell specific CP, to ensure a reliable link performance. The data channel can use a different CP than the cell specific CP. The downlink control information (DCI) can contain the information regarding to the CP length of the data channel. This method can be combined with the Method 3, by communicating in a radio resource control (RRC) signal having a cyclic prefix (CP) length for a data channel for a device. In one aspect of the combined method, the eNB can communicate a set of different CP lengths to a UE by a dedicated RRC signaling. In each TTI, the DCI signals which particular CP length in the configured set of CP lengths is adopted in this particular scheduled data channel. This increases the UE scheduling flexibility at the eNB, and the CP length of the data channel for a particular UE can be dynamically adjusted on a TTI basis.

For example, as described in FIG. 1, two UEs are served in a cell, defined as UE1 and UE2. The UE1 is close to the eNB, and the UE2 is close to the cell edge. The eNB can configure two possible CP lengths for the UE1, i.e., {Tcp and 0} where the Tcp defines the cell specific CP. At the pth TTI(p) containing the data channels for both UEs, the eNB can choose the Tcp as the CP length for the OFDM symbols in the TTI(p). At the qth TTI(q) containing only the data channel of UE1, the eNB can set the CP length to 0. In this case, the DCI for the UE1 can require the addition of one new bit indicating the CP length within the configured set of possible CP lengths, being adopted in the current TTI. In this example, the new bit, represented as "b_CpLength" can define the CP length with the following indication:

$$b_{CpLength} = \begin{cases} 0: CP \text{ is set to } Tcp \\ 1: CP \text{ is set to } 0 \end{cases} \quad (1)$$

In the fourth method, it can be assumed that the control channel for the UE utilizes a fixed CP length so that the control channel can be decoded reliably and no extra CP blind decoding/detection is required for the control channel reception. A new field can be added about the CP length in the downlink control information (DCI) conveyed by the control channel to define the CP length of the data channel scheduled in the current TTI. With this approach, the CP length of the data channel can be dynamically changed in every TTI, and the eNB does not need to partition the TTIs into fixed sets as in the Method 2.

Figure 5:
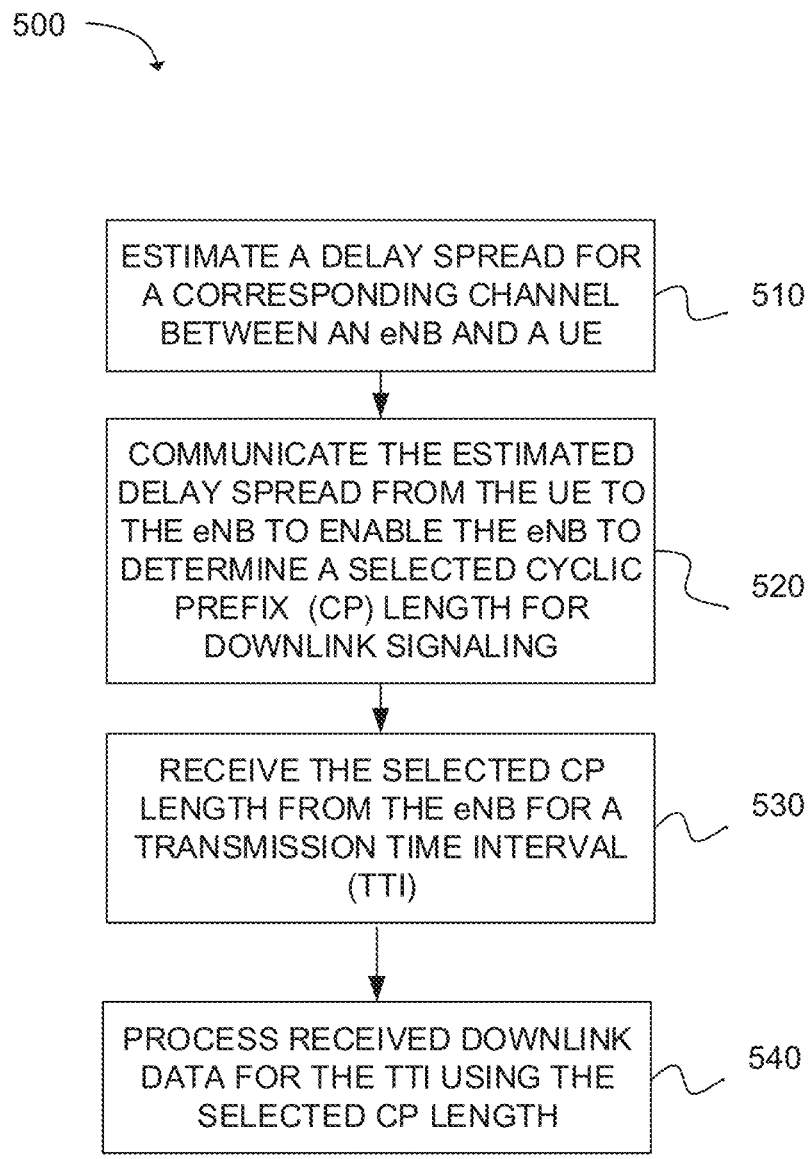
FIG. 5 depicts functionality of a user equipment (UE) operable to perform downlink signaling with an enhanced Node B (eNB) for receiving a UE specific CP length for a transmission time interval (TTI) in accordance with an example.

FIG. 5 depicts functionality 500 of user equipment (UE) operable to perform downlink signaling with an enhanced Node B (eNB) for receiving a UE specific CP length for a transmission time interval (TTI). The functionality 500 can be implemented as a method or the functionality 500 can be executed as instructions on a machine, where the instructions are included on at least one computer readable medium or one non-transitory machine readable storage medium. The one or more processors and memory can be configured to estimate a delay spread for a corresponding channel between an eNB and a UE, as in block 510. The one or more processors and memory can be configured to communicate the estimated delay spread from the UE to the eNB to enable the eNB to determine a selected cyclic prefix (CP) length for downlink signaling, as in block 520. The one or more processors and memory can be configured to receive the selected CP length from the eNB for a transmission time interval (TTI), as in block 530. The one or more processors and memory can be configured to process received downlink data for the TTI using the selected CP length, as in block 540.

In one aspect, the UE receive the selected CP length from the eNB in a physical CP indicator channel (PCPICH) for each TTI. The PCPICH can be located in a first orthogonal frequency-division multiplexing (OFDM) symbol of the TTI. In one aspect, the UE can receive a system information message including a CP length for each TTI broadcasted in a radio frame from the eNB. The CP length can be defined for each TTI. In another aspect, the UE can receive the selected CP length from the eNB via a radio resource control (RRC) messaging signal. In an alternative aspect, the UE can receive the selected CP length from the eNB via a radio resource control (RRC) messaging signal and an alternative selected CP length for each TTI. A downlink control information (DCI) signal can signal whether to use the selected CP length or the alternative selected CP length. A new field can be added to a downlink control information (DCI) control signal indicating the selected CP length or the alternative selected CP length. The UE can also provide feedback from the UE to the eNB to enable the eNB to redetermine the selected CP length.

In one configuration, a first processor can perform the operations in blocks 510, 520, 530, and 540. The first processor can be a single processor, or alternatively, the first processor can be comprised of one or more separate processors. In one configuration, a second processor can perform the operations in blocks 510, 520, 530, and 540.

Figure 6:
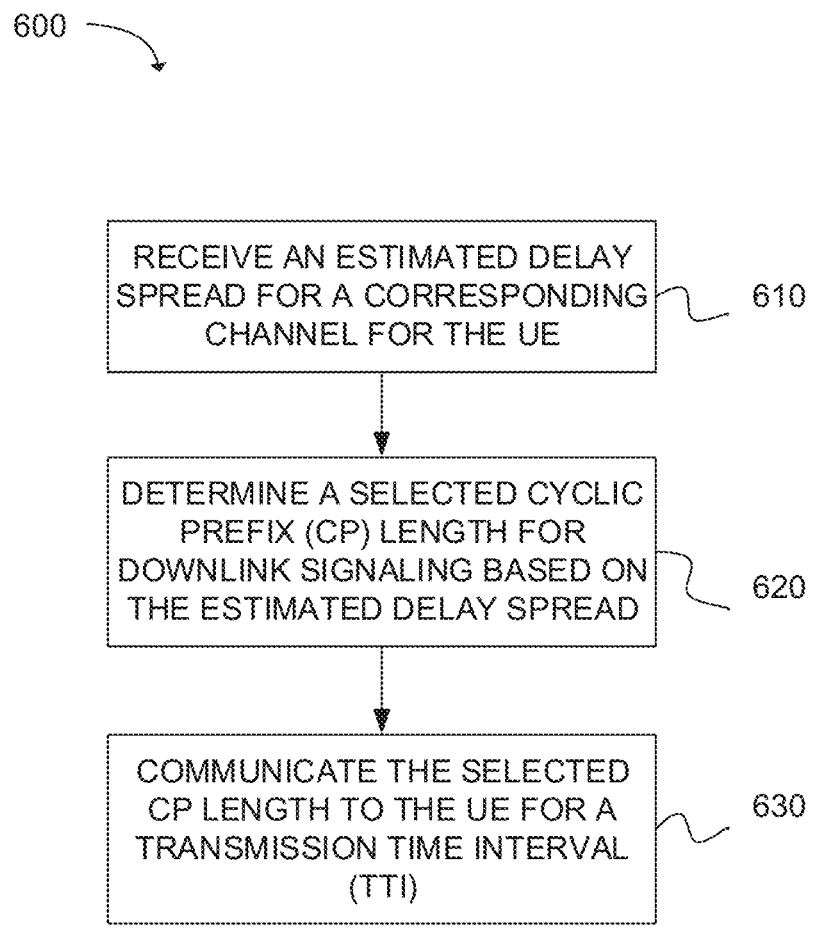
FIG. 6 depicts functionality of an enhanced Node B (eNB) operable to perform downlink signaling with a user equipment (UE) for communicating a UE specific CP length for a transmission time interval (TTI) in accordance with an example.

FIG. 6 depicts functionality of depicts functionality 600 of an enhanced Node B (eNB) operable to perform downlink signaling with a user equipment (UE) for communicating a UE specific CP length for a transmission time interval (TTI) in accordance with an example.

The functionality 600 can be implemented as a method or the functionality 600 can be executed as instructions on a machine, where the instructions are included on at least one computer readable medium or one non-transitory machine readable storage medium. The one or more processors and memory can be configured to receive an estimated delay spread for a corresponding channel for the UE, as in block 610. The one or more processors and memory can be configured to determine a selected cyclic prefix (CP) length for downlink signaling based on the estimated delay spread, as in block 620. The one or more processors and memory can be configured to communicate the selected CP length to the UE for a transmission time interval (TTI), as in block 630.

In one aspect, the eNB can communicate the selected CP length to the UE in a physical CP indicator channel (PCPICH) for each TTI. The PCPICH can be located in a first orthogonal frequency-division multiplexing (OFDM) symbol of the TTI. Alternatively, the eNB can broadcast to the UE the selected CP length for each TTI in a radio frame. The selected CP length can be defined for each TTI. In another aspect, the eNB can communicate the selected CP length to the UE via a radio resource control (RRC) messaging signal. In one aspect, the eNB can communicate the selected CP length to the UE via a radio resource control (RRC) messaging signal and an alternative selected CP length for each TTI. A downlink control information (DCI) signal can signal whether to use the selected CP length or the alternative selected CP length, wherein a new field is added to a downlink control information (DCI) control signal indicating the selected CP length or the alternative selected CP length. The eNB can also redetermine the selected CP length based upon feedback from the UE. The eNB can also divide a plurality of UEs into a plurality of different groups using a plurality of different CP lengths, wherein each of the UEs in each of the plurality of groups can be scheduled in a same TTI with a same CP.

In one configuration, a first processor can perform the operations in blocks 610, 620, and 630. The first processor can be a single processor, or alternatively, the first processor can be comprised of one or more separate processors. In one configuration, a second processor can perform the operations in blocks 610, 620 and/or 630.

Figure 7:
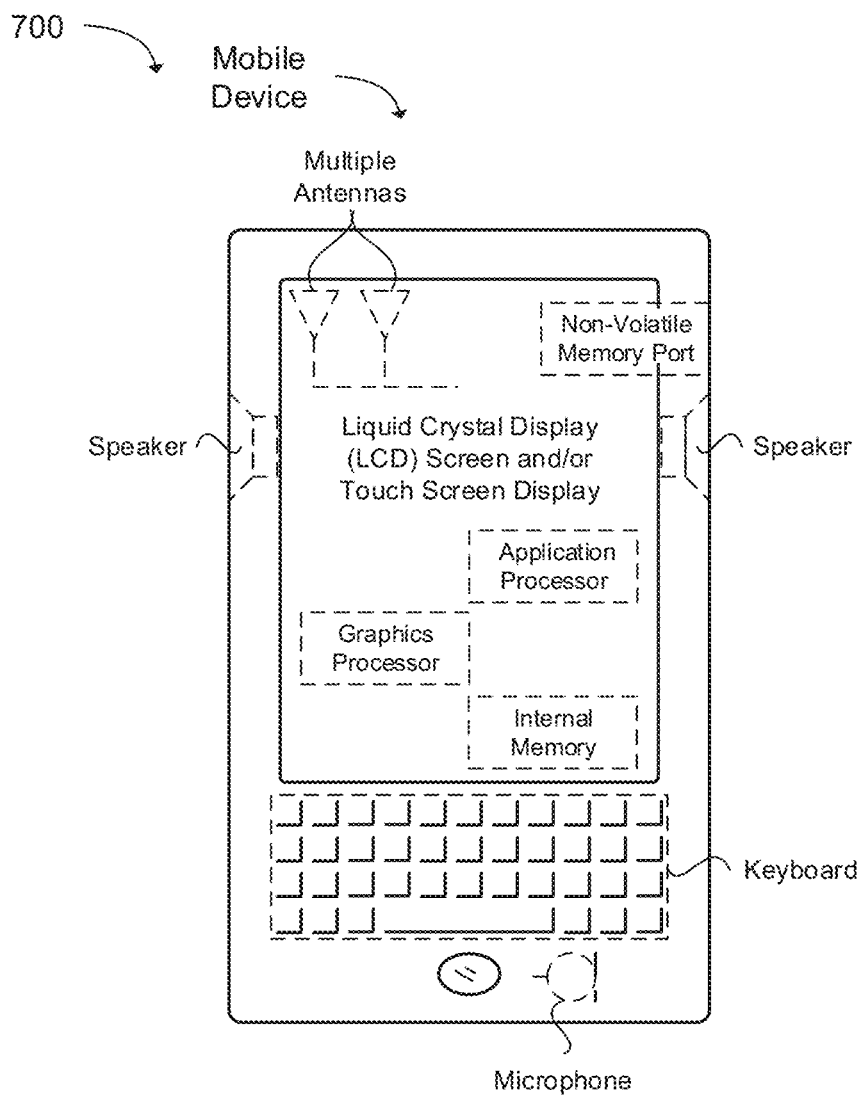
FIG. 7 illustrates a diagram of a wireless device (e.g., UE) in accordance with an example.

FIG. 7 provides an example illustration of the wireless device 700, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

EXAMPLES

Example 1 includes an apparatus of a user equipment (UE) operable for downlink signaling with an enhanced Node B (eNB), the apparatus comprising one or more processors and memory configured to: estimate a delay spread for a corresponding channel between the eNB and the UE; communicate the estimated delay spread from the UE to the eNB to enable the eNB to determine a selected cyclic prefix (CP) length for downlink signaling; receive the selected CP length from the eNB for a transmission time interval (TTI); and process received downlink data for the TTI using the selected CP length.

Example 2 includes the apparatus of Example 1, further configured to receive the selected CP length from the eNB in a physical CP indicator channel (PCPICH) for each TTI, wherein the PCPICH is located in a first orthogonal frequency-division multiplexing (OFDM) symbol of the TTI.

Example 3 includes the apparatus of example 1, further configured to receive the selected CP length is further configured to receive a system information message including a CP length for each TTI broadcasted in a radio frame from the eNB.

Example 4 includes the apparatus of example 3, wherein the CP length is defined for each TTI.

Example 5 includes the apparatus of example 1, further configured to receive the selected CP length from the eNB via a radio resource control (RRC) messaging signal.

Example 6 includes the apparatus of example 1, further configured to receive the selected CP length from the eNB via a radio resource control (RRC) messaging signal and an alternative selected CP length for each TTI.

Example 7 includes the apparatus of example 6, wherein a downlink control information (DCI) signal signals whether to use the selected CP length or the alternative selected CP length.

Example 8 includes the apparatus of example 7, wherein a new field is added to a downlink control information (DCI) control signal indicating the selected CP length or the alternative selected CP length.

Example 9 includes the apparatus of example 1, further configured to provide feedback from the UE to the eNB to enable the eNB to redetermine the selected CP length.

Example 10 includes an apparatus of an enhanced Node B (eNB) operable for downlink signaling with a user equipment (UE), the apparatus comprising one or more processors and memory configured to: receive an estimated delay spread for a corresponding channel for the UE; determine a selected cyclic prefix (CP) length for downlink signaling based on the estimated delay spread; and communicate the selected CP length to the UE for a transmission time interval (TTI).

Example 11 includes the apparatus of example 10, further configured to communicate the selected CP length to the UE in a physical CP indicator channel (PCPICH) for each TTI.

Example 12 includes the apparatus of example 11, wherein the PCPICH is located in a first orthogonal frequency-division multiplexing (OFDM) symbol of the TTI.

Example 13 includes the apparatus of example 10, further configured to broadcast to the UE the selected CP length for each TTI in a radio frame.

Example 14 includes the apparatus of example 13, wherein the selected CP length is defined for each TTI.

Example 15 includes the apparatus of example 10, further configured to communicate the selected CP length to the UE via a radio resource control (RRC) messaging signal.

Example 16 includes the apparatus of example 10, further configured to communicate the selected CP length to the UE via a radio resource control (RRC) messaging signal and an alternative selected CP length for each TTI.

Example 17 includes the apparatus of example 10 or 16, wherein a downlink control information (DCI) signal signals whether to use the selected CP length or the alternative selected CP length, wherein a new field is added to a downlink control information (DCI) control signal indicating the selected CP length or the alternative selected CP length.

Example 18 includes the apparatus of example 10, further configured to redetermine the selected CP length based upon feedback from the UE.

Example 19 includes the apparatus of example 10, further configured to divide a plurality of UEs into a plurality of different groups using a plurality of different CP lengths, wherein each of the UEs in each of the plurality of groups can be scheduled in a same TTI with a same CP.

Example 20 includes at least one non-transitory computer-readable storage medium, on a user equipment (UE) having at least one processor, comprising instructions for downlink signaling with an enhanced Node B (eNB), the instructions when executed perform the following: estimating a delay spread for a corresponding channel between the eNB and the UE; communicating the estimated delay spread from the UE to the eNB to enable the eNB to determine a selected cyclic prefix (CP) length for downlink signaling; receiving the selected CP length from the eNB for a transmission time interval (TTI); and process received downlink data for the TTI using the selected CP length.

Example 21 includes the at least one non-transitory machine readable storage medium of example 20, further comprising instructions which when executed by the at least one processor of the UE performs the following: receiving the selected CP length from the eNB in a physical CP indicator channel (PCPICH) for each TTI.

Example 22 includes the at least one non-transitory machine readable storage medium of example 20, further comprising instructions which when executed by the at least one processor of the UE performs the following: receiving the selected CP length is further configured to receive a system information message including a CP length for each TTI broadcasted in a radio frame from the eNB.

Example 23 includes the at least one non-transitory machine readable storage medium of example 20, further comprising instructions which when executed by the at least one processor of the UE performs the following: receiving the selected CP length from the eNB via a radio resource control (RRC) messaging signal.

Example 24 includes the at least one non-transitory machine readable storage medium of example 20, further comprising instructions which when executed by the at least one processor of the UE performs the following: receiving the selected CP length from the eNB via a radio resource control (RRC) messaging signal and an alternative selected CP length for each TTI.

Example 25 includes the at least one non-transitory machine readable storage medium of example 20, further comprising instructions which when executed by the at least one processor of the UE performs the following: providing feedback from the UE to the eNB to enable the eNB to redetermine the selected CP length.

Example 26 includes an apparatus of a user equipment (UE) operable for downlink signaling with an enhanced Node B (eNB), the apparatus comprising one or more processors and memory configured to: estimate a delay spread for a corresponding channel between the eNB and the UE; communicate the estimated delay spread from the UE to the eNB to enable the eNB to determine a selected cyclic prefix (CP) length for downlink signaling; receive the selected CP length from the eNB for a transmission time interval (TTI); and process received downlink data for the TTI using the selected CP length.

Example 27 includes the apparatus of example example 20, further configured to receive the selected CP length from the eNB in a physical CP indicator channel (PCPICH) for each TTI.

Example 28 includes the apparatus of examples of examples 26 or 27, wherein the PCPICH is located in a first orthogonal frequency-division multiplexing (OFDM) symbol of the TTI.

Example 29 includes the apparatus of example of example 26, further configured to receive the selected CP length is further configured to receive a system information message including a CP length for each TTI broadcasted in a radio frame from the eNB.

Example 30 includes the apparatus of example of example 26, wherein the CP length is defined for each TTI.

Example 31 includes the apparatus of example of example 26, further configured to receive the selected CP length from the eNB via a radio resource control (RRC) messaging signal.

Example 32 includes the apparatus of example of example 26, further configured to receive the selected CP length from the eNB via a radio resource control (RRC) messaging signal and an alternative selected CP length for each TTI.

Example 33 includes the apparatus of examples of examples 26 or 32, wherein a downlink control information (DCI) signal signals whether to use the selected CP length or the alternative selected CP length.

Example 34 includes the apparatus of example of example 26, wherein a new field is added to a downlink control information (DCI) control signal indicating the selected CP length or the alternative selected CP length.

Example 35 includes the apparatus of example of example 26, further configured to provide feedback from the UE to the eNB to enable the eNB to redetermine the selected CP length.

Example 36 include an apparatus of an enhanced Node B (eNB) operable for downlink signaling with a user equipment (UE), the apparatus comprising one or more processors and memory configured to: receive an estimated delay spread for a corresponding channel for the UE; determine a selected cyclic prefix (CP) length for downlink signaling based on the estimated delay spread; and communicate the selected CP length to the UE for a transmission time interval (TTI).

Example 37 includes the apparatus of example of example 36, further configured to communicate the selected CP length to the UE in a physical CP indicator channel (PCPICH) for each TTI.

Example 38 includes the apparatus of examples of examples 36 or 37, wherein the PCPICH is located in a first orthogonal frequency-division multiplexing (OFDM) symbol of the TTI.

Example 39 includes the apparatus of example of example 36, further configured to broadcast to the UE the selected CP length for each TTI in a radio frame.

Example 40 includes the apparatus of examples of examples 36 or 39, wherein the selected CP length is defined for each TTI.

Example 41 includes the at least one non-transitory machine readable storage medium of example 36, further configured to communicate the selected CP length to the UE via a radio resource control (RRC) messaging signal.

Example 42 includes the at least one non-transitory machine readable storage medium of example 36, further configured to communicate the selected CP length to the UE via a radio resource control (RRC) messaging signal and an alternative selected CP length for each TTI.

Example 43 includes the at least one non-transitory machine readable storage medium of examples 36 or 42, wherein a downlink control information (DCI) signal signals whether to use the selected CP length or the alternative selected CP length, wherein a new field is added to a downlink control information (DCI) control signal indicating the selected CP length or the alternative selected CP length.

Example 44 includes the at least one non-transitory machine readable storage medium of example 36, further configured to redetermine the selected CP length based upon feedback from the UE.

Example 45 includes the at least one non-transitory machine readable storage medium of example 36, further configured to divide a plurality of UEs into a plurality of different groups using a plurality of different CP lengths, wherein each of the UEs in each of the plurality of groups can be scheduled in a same TTI with a same CP.

Example 46 includes at least one non-transitory computer-readable storage medium, on a user equipment (UE) having at least one processor, comprising instructions for downlink signaling with an enhanced Node B (eNB), the instructions when executed perform the following: estimating a delay spread for a corresponding channel between the eNB and the UE; communicating the estimated delay spread from the UE to the eNB to enable the eNB to determine a selected cyclic prefix (CP) length for downlink signaling; receiving the selected CP length from the eNB for a transmission time interval (TTI); and process received downlink data for the TTI using the selected CP length.

Example 47 includes the at least one non-transitory machine readable storage medium of example 46, further comprising instructions which when executed by the at least one processor of the UE performs the following: receiving the selected CP length from the eNB in a physical CP indicator channel (PCPICH) for each TTI.

Example 48 includes the at least one non-transitory machine readable storage medium of examples 46 or 47, further comprising instructions which when executed by the at least one processor of the UE performs the following: receiving the selected CP length is further configured to receive a system information message including a CP length for each TTI broadcasted in a radio frame from the eNB.

Example 49 includes the at least one non-transitory machine readable storage medium of example 46, further comprising instructions which when executed by the at least one processor of the UE performs the following: receiving the selected CP length from the eNB via a radio resource control (RRC) messaging signal.

Example 50 includes the at least one non-transitory machine readable storage medium of example 46, further comprising instructions which when executed by the at least one processor of the UE performs the following: receiving the selected CP length from the eNB via a radio resource control (RRC) messaging signal and an alternative selected CP length for each TTI.

Example 51 includes the at least one non-transitory machine readable storage medium of examples 46 or 50, further comprising instructions which when executed by the at least one processor of the UE performs the following: providing feedback from the UE to the eNB to enable the eNB to redetermine the selected CP length.

Example 52 includes an apparatus of a user equipment (UE) operable for downlink signaling with an enhanced Node B (eNB), the apparatus comprising one or more processors and memory configured to: estimate a delay spread for a corresponding channel between the eNB and the UE; communicate the estimated delay spread from the UE to the eNB to enable the eNB to determine a selected cyclic prefix (CP) length for downlink signaling; receive the selected CP length from the eNB for a transmission time interval (TTI); and process received downlink data for the TTI using the selected CP length.

Example 53 includes the apparatus of example of example 52, further configured to: receive the selected CP length from the eNB in a physical CP indicator channel (PCPICH) for each TTI, wherein the PCPICH is located in a first orthogonal frequency-division multiplexing (OFDM) symbol of the TTI; receive the selected CP length is further configured to receive a system information message including a CP length for each TTI broadcasted in a radio frame from the eNB, wherein the CP length is defined for each TTI; or receive the selected CP length from the eNB via a radio resource control (RRC) messaging signal.

Example 54 includes the apparatus of examples of examples 52 or 53, further configured to receive the selected CP length from the eNB via a radio resource control (RRC) messaging signal and an alternative selected CP length for each TTI, wherein a downlink control information (DCI) signal signals whether to use the selected CP length or the alternative selected CP length, and a new field is added to a downlink control information (DCI) control signal indicating the selected CP length or the alternative selected CP length.

Example 55 includes the apparatus of example of examples to 52 to 54, further configured to provide feedback from the UE to the eNB to enable the eNB to redetermine the selected CP length.

Example 56 includes an apparatus of an enhanced Node B (eNB) operable for downlink signaling with a user equipment (UE), the apparatus comprising one or more processors and memory configured to: receive an estimated delay spread for a corresponding channel for the UE; determine a selected cyclic prefix (CP) length for downlink signaling based on the estimated delay spread; and communicate the selected CP length to the UE for a transmission time interval (TTI).

Example 57 includes the apparatus of example of example 56, further configured to communicate the selected CP length to the UE in a physical CP indicator channel (PCPICH) for each TTI, wherein the PCPICH is located in a first orthogonal frequency-division multiplexing (OFDM) symbol of the TTI.

Example 58 includes the apparatus of examples of examples to 56 or 57, further configured to broadcast to the UE the selected CP length for each TTI in a radio frame, wherein the selected CP length is defined for each TTI.

Example 59 includes the apparatus of examples of examples to 56 to 58, further configured to communicate the selected CP length to the UE via a radio resource control (RRC) messaging signal.

Example 60 includes the apparatus of examples of examples to 56 to 59, further configured to communicate the selected CP length to the UE via a radio resource control (RRC) messaging signal and an alternative selected CP length for each TTI, wherein a downlink control information (DCI) signal signals whether to use the selected CP length or the alternative selected CP length, wherein a new field is added to a downlink control information (DCI) control signal indicating the selected CP length or the alternative selected CP length.

Example 61 includes the apparatus of examples of examples to 56 to 60, further configured to: redetermine the selected CP length based upon feedback from the UE, or divide a plurality of UEs into a plurality of different groups using a plurality of different CP lengths, wherein each of the UEs in each of the plurality of groups can be scheduled in a same TTI with a same CP.

Example 62 includes at least one non-transitory computer-readable storage medium, on a user equipment (UE) having at least one processor, comprising instructions for downlink signaling with an enhanced Node B (eNB), the instructions when executed perform the following: estimating a delay spread for a corresponding channel between the eNB and the UE; communicating the estimated delay spread from the UE to the eNB to enable the eNB to determine a selected cyclic prefix (CP) length for downlink signaling; receiving the selected CP length from the eNB for a transmission time interval (TTI); and process received downlink data for the TTI using the selected CP length.

Example 63 includes the at least one non-transitory machine readable storage medium of example 62, further comprising instructions which when executed by the at least one processor of the UE performs the following: receiving the selected CP length from the eNB in a physical CP indicator channel (PCPICH) for each TTI; or receiving the selected CP length is further configured to receive a system information message including a CP length for each TTI broadcasted in a radio frame from the eNB.

Example 64 includes the at least one non-transitory machine readable storage medium of examples 62 or 63, further comprising instructions which when executed by the at least one processor of the UE performs the following: receiving the selected CP length from the eNB via a radio resource control (RRC) messaging signal.

Example 65 includes the at least one non-transitory machine readable storage medium of examples 62-64, further comprising instructions which when executed by the at least one processor of the UE performs the following: receiving the selected CP length from the eNB via a radio resource control (RRC) messaging signal and an alternative selected CP length for each TTI.

Example 66 includes the at least one non-transitory machine readable storage medium of examples 62-65, further comprising instructions which when executed by the at least one processor of the UE performs the following:

providing feedback from the UE to the eNB to enable the eNB to redetermine the selected CP length.

Example 67 includes a device for downlink signaling with an enhanced Node B (eNB), the device comprising: means for estimating a delay spread for a corresponding channel between the eNB and the UE; means for communicating the estimated delay spread from the UE to the eNB to enable the eNB to determine a selected cyclic prefix (CP) length for downlink signaling; means for receiving the selected CP length from the eNB for a transmission time interval (TTI); and means for processing received downlink data for the TTI using the selected CP length.

Example 68 includes the device of example 67, further comprising means for receiving the selected CP length from the eNB in a physical CP indicator channel (PCPICH) for each TTI.

Example 69 includes the device of examples 67 or 68, further comprising means for receiving the selected CP length is further configured to receive a system information message including a CP length for each TTI broadcasted in a radio frame from the eNB.

Example 70 includes the device of examples 67-60, further comprising means for receiving the selected CP length from the eNB via a radio resource control (RRC) messaging signal.

Example 71 includes the device of examples 67-70, further comprising means for receiving the selected CP length from the eNB via a radio resource control (RRC) messaging signal and an alternative selected CP length for each TTI.

Example 72 includes the device of examples 67-71, further comprising means for providing feedback from the UE to the eNB to enable the eNB to redetermine the selected CP length.

Figure 8:
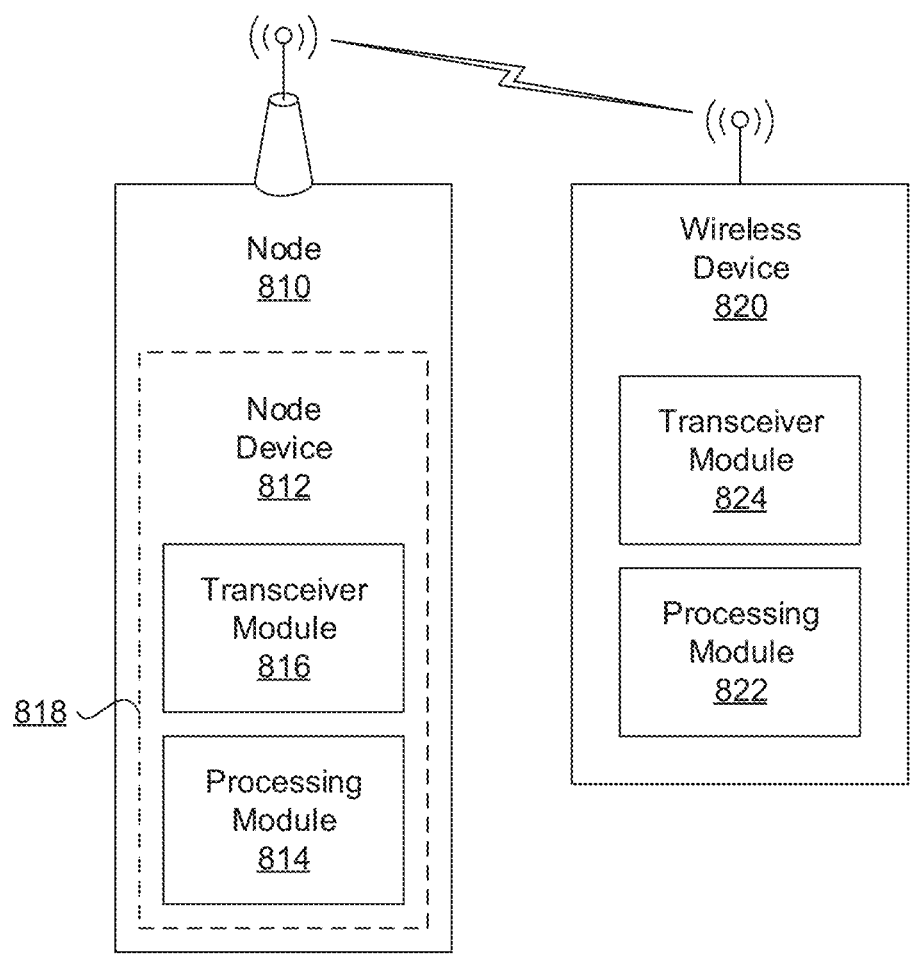
FIG. 8 illustrates a diagram of a node (e.g., eNB) and wireless device (e.g., UE) in accordance with an example.

FIG. 8 illustrates an example node 810 (e.g., eNB) and an example wireless device 820 (e.g., UE). The node can include a base station (BS), a Node B (NB), an evolved Node B (eNB), a baseband unit (BBU), a remote radio head (RRH), a remote radio equipment (RRE), a remote radio unit (RRU), or a central processing module (CPM). The node can include a node device 812. The node device or the node can be configured to communicate with the wireless device. The node device can be configured to implement the technology described. The node device can include a processing module 814 and a transceiver module 816. In one aspect, the node device 812 can include the transceiver module 816 and the processing module 814 forming a circuitry 818 for the node 810. In one aspect, the transceiver module 816 and the processing module 814 can form a circuitry of the node device 812. The wireless device 820 can include a transceiver module 824 and a processing module 822. The wireless device can be configured to implement the technology described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Figure 9:
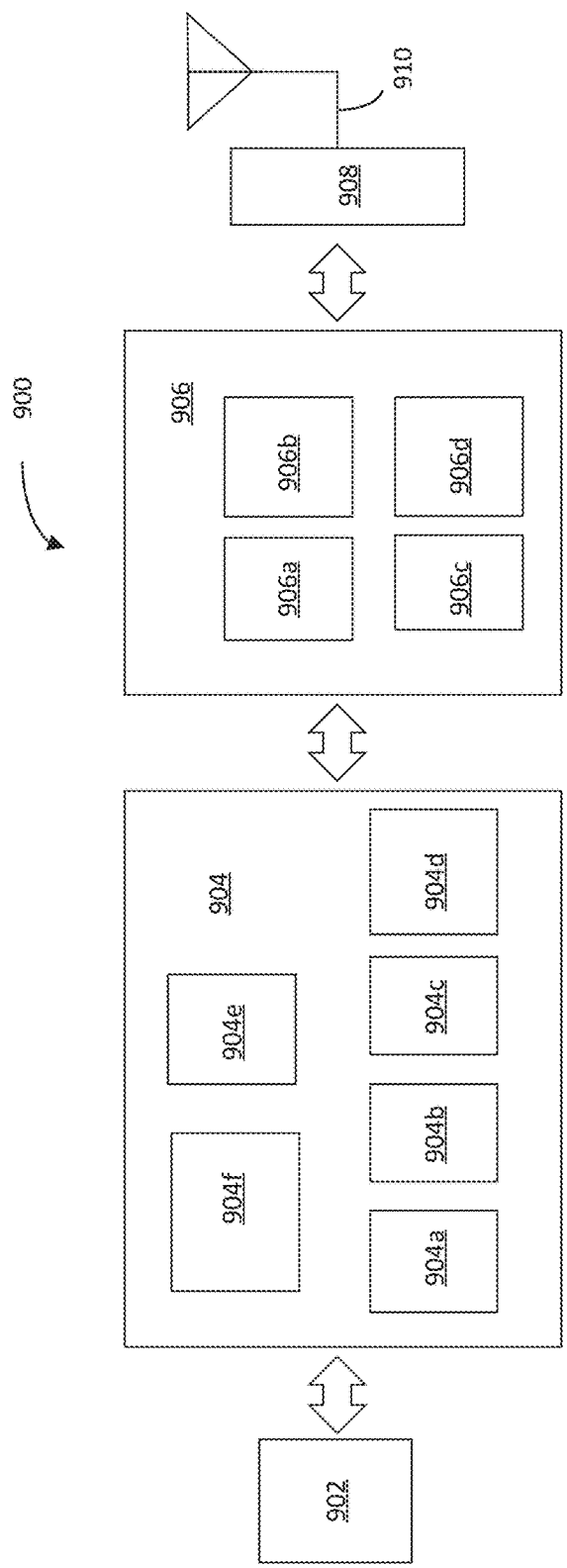
FIG. 9 illustrates a diagram of example components of a User Equipment (UE) device in accordance with an example.

Aspects described herein can be implemented into a system using any suitably configured hardware and/or software. FIG. 9 illustrates, for one aspect, example components of a User Equipment (UE) device 900. In some aspects, the UE device 900 can include application circuitry 902, baseband circuitry 904, Radio Frequency (RF) circuitry 906, front-end module (FEM) circuitry 908 and one or more antennas 910, coupled together at least as shown.

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 904 can include circuitry such as, but not limited to, one or more single-core or multi-core processors. The baseband circuitry 904 can include one or more baseband processors and/or control logic to process baseband signals received from a receive signal path of the RF circuitry 906 and to generate baseband signals for a transmit signal path of the RF circuitry 906. Baseband processing circuitry 904 can interface with the application circuitry 902 for generation and processing of the baseband signals and for controlling operations of the RF circuitry 906. For example, in some aspects, the baseband circuitry 904 can include a second generation (2G) baseband processor 904$a$, third generation (3G) baseband processor 904$b$, fourth generation (4G) baseband processor 904$c$, and/or other baseband processor(s) 904$d$ for other existing generations, generations in development or to be developed in the future (e.g., fifth generation (5G), 6G, etc.). The baseband circuitry 904 (e.g., one or more of baseband processors 904$a$-$d$) can handle various radio control functions that enable communication with one or more radio networks via the RF circuitry 906. The radio control functions can include, but are not limited to, signal modulation/demodulation, encoding/decoding, radio frequency shifting, etc. In some aspects, modulation/demodulation circuitry of the baseband circuitry 904 can include Fast-Fourier Transform (FFT), precoding, and/or constellation mapping/demapping functionality. In some aspects, encoding/decoding circuitry of the baseband circuitry 904 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904$e$ of the baseband circuitry 904 can be configured to run elements of the protocol stack for signaling of the PHY, MAC, RLC, PDCP and/or RRC layers. In some aspects, the baseband circuitry can include one or more audio digital signal processor(s) (DSP) 904$f$. The audio DSP(s) 904$f$ can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 904 and the application circuitry 902 can be implemented together such as, for example, on a system on a chip (SOC).

In some aspects, the baseband circuitry 904 can provide for communication compatible with one or more radio technologies. For example, in some aspects, the baseband circuitry 904 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various aspects, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some aspects, the RF circuitry 906 can include a receive signal path and a transmit signal path. The receive signal path of the RF circuitry 906 can include mixer circuitry 906a, amplifier circuitry 906b and filter circuitry 906c. The transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some aspects, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some aspects, the output baseband signals can be zero-frequency baseband signals, although this is not a requirement. In some aspects, mixer circuitry 906a of the receive signal path can comprise passive mixers, although the scope of the aspects is not limited in this respect.

In some aspects, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c. The filter circuitry 906c can include a low-pass filter (LPF), although the scope of the aspects is not limited in this respect.

In some aspects, the mixer circuitry 906a of the receive signal path and the mixer circuitry 906a of the transmit signal path can include two or more mixers and can be arranged for quadrature downconversion and/or upconversion respectively. In some aspects, the mixer circuitry 906a of the receive signal path and the mixer circuitry 906a of the transmit signal path can include two or more mixers and can be arranged for image rejection (e.g., Hartley image rejection). In some aspects, the mixer circuitry 906a of the receive signal path and the mixer circuitry 906a can be arranged for direct downconversion and/or direct upconversion, respectively. In some aspects, the mixer circuitry 906a of the receive signal path and the mixer circuitry 906a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode embodiments, a separate radio IC circuitry can be provided for processing signals for each spectrum, although the scope of the embodiments is not limited in this respect.

In some embodiments, the synthesizer circuitry 906d can be a fractional-N synthesizer or a fractional N/N+1 synthesizer, although the scope of the embodiments is not limited in this respect as other types of frequency synthesizers can be suitable. For example, synthesizer circuitry 906d can be a delta-sigma synthesizer, a frequency multiplier, or a synthesizer comprising a phase-locked loop with a frequency divider.

The synthesizer circuitry 906d can be configured to synthesize an output frequency for use by the mixer circuitry 906a of the RF circuitry 906 based on a frequency input and a divider control input. In some embodiments, the synthesizer circuitry 906d can be a fractional N/N+1 synthesizer.

In some embodiments, frequency input can be provided by a voltage controlled oscillator (VCO), although that is not a requirement. Divider control input can be provided by either the baseband circuitry 904 or the applications processor 902 depending on the desired output frequency. In some embodiments, a divider control input (e.g., N) can be determined from a look-up table based on a channel indicated by the applications processor 902.

Synthesizer circuitry 906d of the RF circuitry 906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 906 can include an IQ/polar converter.

FEM circuitry 908 can include a receive signal path which can include circuitry configured to operate on RF signals received from one or more antennas 910, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 910.

In some embodiments, the FEM circuitry 908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 can include additional elements such as, for example, memory/storage, display, camera, sensor, and/or input/output (I/O) interface.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit/circuitry comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for downlink signaling with an enhanced Node B (eNB), the apparatus comprising one or more processors and memory configured to:
    estimate a delay spread for a corresponding channel between the eNB and the UE;
    communicate the estimated delay spread from the UE to the eNB to enable the eNB to determine a selected cyclic prefix (CP) length for downlink signaling;
    receive the selected CP length from the eNB for a transmission time interval (TTI);
    process received downlink data for the TTI using the selected CP length;
    provide feedback from the UE to the eNB to enable the eNB to redetermine the selected CP length; and
    receive the selected CP length from the eNB in a physical CP indicator channel (PCPICH) for each TTI, wherein the PCPICH uses a cell specific CP to enable UEs in a cell to demodulate the PCPICH, and wherein the PCPICH is configured to signal that the selected CP length is to be used for a data channel in a current TTI.

2. The apparatus of claim 1, wherein the PCPICH is located in a first orthogonal frequency-division multiplexing (OFDM) symbol of the TTI.

3. The apparatus of claim 1, further configured to receive the selected CP length is further configured to receive a system information message including a CP length for each TTI broadcasted in a radio frame from the eNB.

4. The apparatus of claim 3, wherein the CP length is defined for each TTI.

5. The apparatus of claim 1, further configured to receive the selected CP length from the eNB via a radio resource control (RRC) messaging signal.

6. The apparatus of claim 1, further configured to receive the selected CP length from the eNB via a radio resource control (RRC) messaging signal and an alternative selected CP length for each TTI.

7. The apparatus of claim 6, wherein a downlink control information (DCI) signal signals whether to use the selected CP length or the alternative selected CP length.

8. The apparatus of claim 1, wherein a new field is added to a downlink control information (DCI) control signal indicating the selected CP length or the alternative selected CP length.

9. An apparatus of an enhanced Node B (eNB) operable for downlink signaling with a user equipment (UE), the apparatus comprising one or more processors and memory configured to:
    receive an estimated delay spread for a corresponding channel for the UE;
    determine a selected cyclic prefix (CP) length for downlink signaling based on the estimated delay spread;
    communicate the selected CP length to the UE for a transmission time interval (TTI);
    redetermine the selected CP length based upon feedback from the UE; and
    communicate the selected CP length to the UE in a physical CP indicator channel (PCPICH) for each TTI, wherein the PCPICH uses a cell specific CP to enable UEs in a cell to demodulate the PCPICH, and wherein the PCPICH is configured to signal that the selected CP length is to be used for a data channel in a current TTI.

10. The apparatus of claim 9, wherein the PCPICH is located in a first orthogonal frequency-division multiplexing (OFDM) symbol of the TTI.

11. The apparatus of claim 9, further configured to broadcast to the UE the selected CP length for each TTI in a radio frame.

12. The apparatus of claim 11, wherein the selected CP length is defined for each TTI.

13. The apparatus of claim 9, further configured to communicate the selected CP length to the UE via a radio resource control (RRC) messaging signal.

14. The apparatus of claim 9, further configured to communicate the selected CP length to the UE via a radio resource control (RRC) messaging signal and an alternative selected CP length for each TTI.

15. The apparatus of claim 14, wherein a downlink control information (DCI) signal signals whether to use the selected CP length or the alternative selected CP length, wherein a new field is added to a downlink control information (DCI) control signal indicating the selected CP length or the alternative selected CP length.

16. The apparatus of claim 9, further configured to divide a plurality of UEs into a plurality of different groups using a plurality of different CP lengths, wherein each of the UEs in each of the plurality of groups can be scheduled in a same TTI with a same CP.

17. At least one non-transitory computer-readable storage medium, on a user equipment (UE) having at least one processor, comprising instructions for downlink signaling with an enhanced Node B (eNB), the instructions when executed perform the following:
    estimating a delay spread for a corresponding channel between the eNB and the UE;
    communicating the estimated delay spread from the UE to the eNB to enable the eNB to determine a selected cyclic prefix (CP) length for downlink signaling;
    receiving the selected CP length from the eNB for a transmission time interval (TTI);
    process received downlink data for the TTI using the selected CP length;
    providing feedback from the UE to the eNB to enable the eNB to redetermine the selected CP length; and
    receiving the selected CP length from the eNB in a physical CP indicator channel (PCPICH) for each TTI, wherein the PCPICH uses a cell specific CP to enable UEs in a cell to demodulate the PCPICH, and wherein the PCPICH is configured to signal that the selected CP length is to be used for a data channel in a current TTI.

18. The at least one non-transitory machine readable storage medium of claim 17, further comprising instructions which when executed by the at least one processor of the UE performs the following: receiving the selected CP length is further configured to receive a system information message including a CP length for each TTI broadcasted in a radio frame from the eNB.

19. The at least one non-transitory machine readable storage medium of claim 17, further comprising instructions which when executed by the at least one processor of the UE performs the following: receiving the selected CP length from the eNB via a radio resource control (RRC) messaging signal.

20. The at least one non-transitory machine readable storage medium of claim 17, further comprising instructions which when executed by the at least one processor of the UE performs the following: receiving the selected CP length from the eNB via a radio resource control (RRC) messaging signal and an alternative selected CP length for each TTI.

* * * * *